(12) United States Patent
Kamata

(10) Patent No.: US 9,143,011 B2
(45) Date of Patent: Sep. 22, 2015

(54) POWER RECEIVING DEVICE AND CONTACTLESS POWER FEEDING SYSTEM

(75) Inventor: Koichiro Kamata, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 442 days.

(21) Appl. No.: 13/612,990

(22) Filed: Sep. 13, 2012

(65) Prior Publication Data

US 2013/0082648 A1    Apr. 4, 2013

(30) Foreign Application Priority Data

Sep. 29, 2011    (JP) .................................. 2011-215278

(51) Int. Cl.
  *H02J 7/00*    (2006.01)
  *H02J 17/00*   (2006.01)
  *H01F 38/14*   (2006.01)

(52) U.S. Cl.
  CPC  *H02J 17/00* (2013.01); *H01F 38/14* (2013.01)

(58) Field of Classification Search
  CPC .................................. H02J 5/005; H02J 7/025
  USPC ............. 320/107–108, 141; 307/98, 104, 107
  See application file for complete search history.

(56) References Cited

U.S. PATENT DOCUMENTS

| | | | |
|---|---|---|---|
| 4,547,829 A * | 10/1985 | Efford et al. ................ | 361/306.1 |
| 5,124,699 A | 6/1992 | Tervoert et al. | |
| 5,428,521 A | 6/1995 | Kigawa et al. | |
| 5,790,946 A | 8/1998 | Rotzoll | |
| 6,509,217 B1 | 1/2003 | Reddy | |
| 6,737,302 B2 | 5/2004 | Arao | |
| 6,837,438 B1 | 1/2005 | Takasugi et al. | |
| 7,180,421 B2 | 2/2007 | Pahlaven et al. | |
| 7,209,771 B2 | 4/2007 | Twitchell, Jr. | |

(Continued)

FOREIGN PATENT DOCUMENTS

| | | |
|---|---|---|
| EP | 2320538 A | 5/2011 |
| EP | 2 372 870 A1 | 10/2011 |

(Continued)

OTHER PUBLICATIONS

A. Karalis et al., "Efficient Wireless Non-radiative Mid-range Energy Transfer", Annals of Physics 323 (2008), Apr. 27, 2007, pp. 34-48.

(Continued)

*Primary Examiner* — Paul Dinh
(74) *Attorney, Agent, or Firm* — Nixon Peabody LLP; Jeffrey L. Costellia

(57) ABSTRACT

A power receiving device includes a resonant coil, an electromagnetic coupling coil, a rectifier circuit, a smoothing circuit, a voltage converter circuit which converts a voltage value of DC power into another voltage value, a control circuit which obtains voltage and current values of the DC power input to the voltage converter circuit, calculates an impedance from the obtained voltage and current values, and generates a pulse width modulation signal for controlling an output voltage and an output current of the voltage converter circuit, and a load to which the output voltage and the output current of the voltage converter circuit are input. The duty ratio of the pulse width modulation signal is determined so that the impedance calculated by the control circuit becomes close to an impedance for the maximum efficiency in transferring the AC power. The power receiving device is included in a contactless power feeding system.

8 Claims, 8 Drawing Sheets

(56) References Cited

U.S. PATENT DOCUMENTS

| | | |
|---|---|---|
| 7,301,830 B2 | 11/2007 | Takahashi et al. |
| 7,394,382 B2 | 7/2008 | Nitzan et al. |
| 8,716,974 B2 | 5/2014 | Sakoda et al. |
| 2002/0049714 A1 | 4/2002 | Yamazaki et al. |
| 2003/0017804 A1 | 1/2003 | Heinrich et al. |
| 2003/0104848 A1 | 6/2003 | Brideglall |
| 2004/0077383 A1 | 4/2004 | Lappetelainen et al. |
| 2004/0128246 A1 | 7/2004 | Takayama et al. |
| 2004/0131897 A1 | 7/2004 | Jenson et al. |
| 2004/0145454 A1 | 7/2004 | Powell et al. |
| 2005/0020321 A1 | 1/2005 | Rotzoll |
| 2005/0215119 A1 | 9/2005 | Kaneko |
| 2005/0254183 A1 | 11/2005 | Ishida et al. |
| 2006/0009251 A1 | 1/2006 | Noda et al. |
| 2007/0216348 A1 | 9/2007 | Shionoiri et al. |
| 2007/0229228 A1 | 10/2007 | Yamazaki et al. |
| 2007/0229271 A1 | 10/2007 | Shionoiri et al. |
| 2007/0229279 A1 | 10/2007 | Yamazaki et al. |
| 2007/0229281 A1 | 10/2007 | Shionoiri et al. |
| 2007/0278998 A1 | 12/2007 | Koyama |
| 2007/0285246 A1 | 12/2007 | Koyama |
| 2008/0224544 A1 | 9/2008 | Koyama |
| 2010/0244577 A1 | 9/2010 | Shimokawa |
| 2010/0244580 A1 | 9/2010 | Uchida et al. |
| 2010/0259109 A1 | 10/2010 | Sato |
| 2010/0270962 A1* | 10/2010 | Yoon et al. .................. 318/446 |
| 2010/0289449 A1 | 11/2010 | Elo |
| 2011/0080053 A1 | 4/2011 | Urano |
| 2011/0095619 A1 | 4/2011 | Urano |
| 2011/0101791 A1 | 5/2011 | Urano |
| 2011/0109263 A1* | 5/2011 | Sakoda et al. ............... 320/108 |
| 2011/0227421 A1 | 9/2011 | Sakoda et al. |
| 2011/0270462 A1 | 11/2011 | Amano et al. |
| 2012/0032521 A1 | 2/2012 | Inoue et al. |
| 2012/0133212 A1 | 5/2012 | Kamata |
| 2013/0249397 A1* | 9/2013 | Chandran et al. .............. 315/85 |
| 2013/0249485 A1* | 9/2013 | Bohm et al. ................. 320/109 |

FOREIGN PATENT DOCUMENTS

| | | |
|---|---|---|
| EP | 2 421 121 A1 | 2/2012 |
| JP | 2002-101578 | 4/2002 |
| JP | 2006-180073 | 7/2006 |
| JP | 2008-259401 A | 10/2008 |
| JP | 2010-088143 A | 4/2010 |
| JP | 2010-119246 | 5/2010 |
| JP | 2010-130878 | 6/2010 |
| JP | 2010-193598 | 9/2010 |
| JP | 2010-239690 | 10/2010 |
| JP | 2010-239769 | 10/2010 |
| JP | 2010-252446 | 11/2010 |
| JP | 2010-252468 | 11/2010 |
| JP | 2011-120443 A | 6/2011 |
| JP | 2011-142763 A | 7/2011 |
| WO | WO 2010-055381 A1 | 5/2010 |
| WO | WO 2010-064584 A1 | 6/2010 |
| WO | WO 2010-119577 A1 | 10/2010 |
| WO | WO 2012-070634 A1 | 5/2012 |

OTHER PUBLICATIONS

Kurs et al., "Wireless Power Transfer Via Strongly Coupled Magnetic Resonances", Science, Jul. 6, 2007, vol. 317, No. 5834, pp. 83-86.

Miyamoto et al., "Wireless Power Transfer System With a Simple Receiver Coil", IMWS 2011, (2011 IEEE MTT-S International Microwave Workshop Series), May 12, 2011, pp. 131-134.

International Search Report for PCT/JP2011/077109 dated Feb. 21, 2012.

Written Opinion for PCT/JP2011/077109 dated Feb. 21, 2012.

Moriwaki.Y et al., "A Study on Reduction of Reflected Power Using DC/DC Converter in Wireless Power Transfer System via Magnetic Resonant Coupling", Industry Applications Society, Sep. 6, 2011, vol. 2011, No. ROMBUNNO.2-10, pp. 1-4, The Institute of Electrical Engineering of Japan.

Moriwaki.Y et al., "Basic Study on Reduction of Reflected Power Using DC/DC Converters in Wireless Power Transfer System via Magnetic Resonant Coupling", Telecommunications Energy Conference (INTELEC), 2011 IEEE 33rd International, Sep. 13, 2011, pp. 1-5.

* cited by examiner

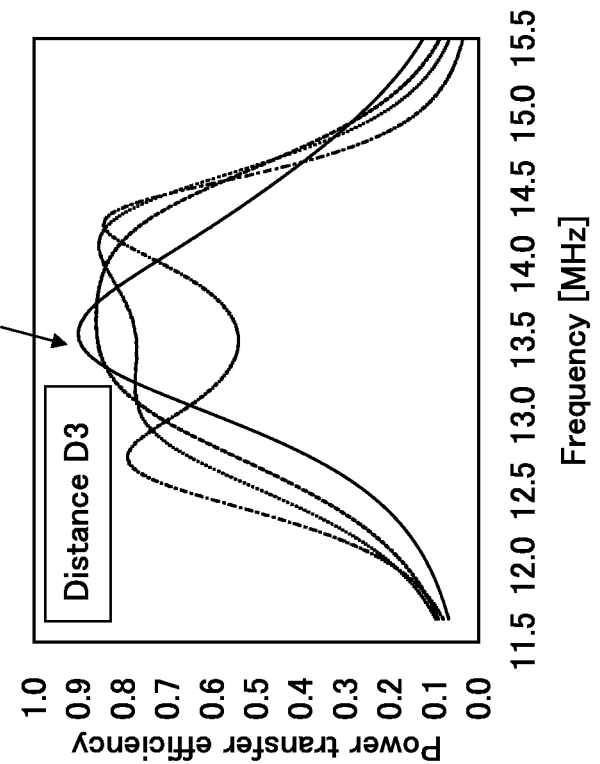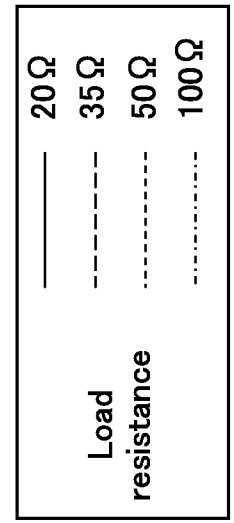
FIG. 5A  35Ω (maximum transfer efficiency)
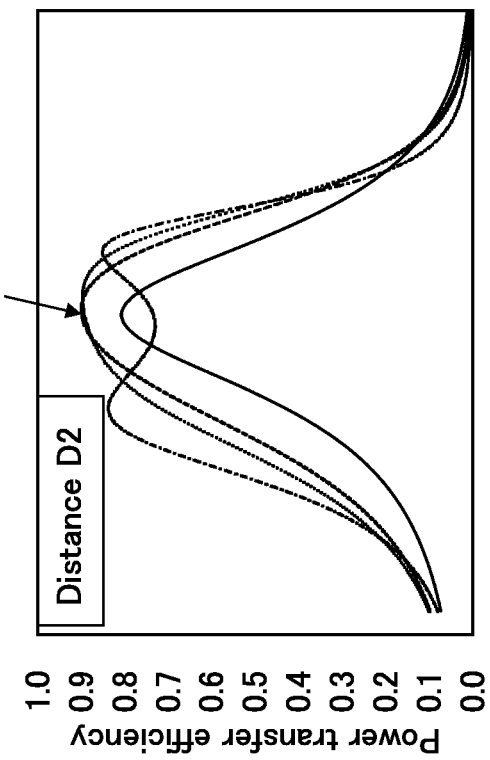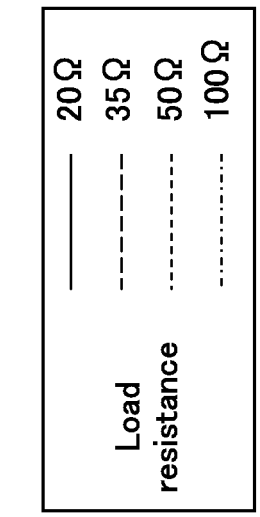
FIG. 5B  20Ω (maximum transfer efficiency)

POWER RECEIVING DEVICE AND CONTACTLESS POWER FEEDING SYSTEM

BACKGROUND OF THE INVENTION

1. Field of the Invention

One embodiment of the invention disclosed herein relates to power receiving devices and contactless power feeding systems.

2. Description of the Related Art

Various electronic devices have spread, and a wide variety of products are in the marketplace. In recent years, portable electronic devices such as mobile phones and digital video cameras are used very commonly. Further, electric propulsion vehicles, such as electric vehicles, which are supplied with power based on electricity, are showing up in the market.

In such mobile phones, digital video cameras, or electric propulsion vehicles, batteries serving as power storage units (also referred to as storage batteries) are incorporated. Currently, such a battery is usually charged by being placed in direct contact with a household AC power source, which is one of power feeding units. In a structure which has no battery or which does not use power stored in a battery, a device is operated by power fed directly from a household AC power source via a wire or the like.

On the other hand, methods by which batteries are charged without contact or power is fed to loads without contact have been researched and developed. Typical methods are an electromagnetic coupling method (also referred to as an electromagnetic induction method) (see Reference 1), a radio wave method (also referred to as a microwave method), and a resonance method (also referred to as a resonant method) (see References 2 to 4).

As described in References 2 to 4, in a contactless power feeding technique using a resonance method, a device that receives power (hereinafter referred to as a power receiving device) and a device that feeds power (hereinafter referred to as a power transmitting device) each have a resonant coil. Further, in each of the power receiving device and the power transmitting device, an electromagnetic coupling coil is provided. Feeding power from a power source to the resonant coil in the power transmitting device and feeding power from the resonant coil to a load in the power receiving device are conducted by the electromagnetic coupling coils.

The resonant coil of the power transmitting device and the resonant coil of the power receiving device are adjusted to exhibit resonance (LC resonance) at the same frequency $f_0$.

When the resonant coil of the power transmitting device and the resonant coil of the power receiving device face each other, they exhibit a resonance (resonant) phenomenon, and thereby efficient power transfer is achieved even when the distance between the resonant coils is large (see Reference 5).

REFERENCES

[Reference 1] Japanese Published Patent Application No. 2002-101578

[Reference 2] Japanese Published Patent Application No. 2010-193598

[Reference 3] Japanese Published Patent Application No. 2010-239690

[Reference 4] Japanese Published Patent Application No. 2010-252468

[Reference 5] "Wireless power feeding 2010, all about contactless charging and wireless power transfer", *Nikkei Electronics, March* 2010, pp. 66-81

SUMMARY OF THE INVENTION

However, in a contactless power feeding system using a resonance method, the efficiency of power transfer is lowered when the resonant coil of the power transmitting device and the resonant coil of the power receiving device are not in appropriate positions.

In other words, when the resonant coil of the power transmitting device and the resonant coil of the power receiving device are too distant from each other, the efficiency of power transfer is lowered. In addition, also when the resonant coil of the power transmitting device and the resonant coil of the power receiving device are too close, the efficiency of power transfer is lowered.

FIGS. 3A and 3B are a schematic diagram and a perspective view of a contactless power feeding system using a resonance method, and FIGS. 4A to 4C are graphs showing the relationship between frequency and power transfer efficiency with variation in the distance D between a resonant coil of a power transmitting device and a resonant coil of a power receiving device.

The contactless power feeding system using a resonance method illustrated in FIGS. 3A and 3B includes a power transmitting device 1100 and a power receiving device 1110. The power transmitting device 1100 includes an AC power source 1101, an electromagnetic coupling coil 1103, and a resonant coil 1104. The power receiving device 1110 includes a load 1111, an electromagnetic coupling coil 1112, and a resonant coil 1113. In FIGS. 3A and 3B, the distance D between the resonant coil 1104 of the power transmitting device 1100 and the resonant coil 1113 of the power receiving device 1110 is regarded as the distance between the power transmitting device 1100 and the power receiving device 1110.

Although, in FIGS. 3A and 3B, the power transmitting device 1100 includes the electromagnetic coupling coil 1103, the resonant coil 1104, and a capacitor 1105 (collectively referred to as a power transmitting element 1151) and the power receiving device 1110 includes the electromagnetic coupling coil 1112, the resonant coil 1113, and a capacitor 1115 (collectively referred to as a power receiving element 1152), the power transmitting element 1151 and the power receiving element 1152 may each be a magnetic field type element including a helical antenna or an electric field type element including a meander line antenna.

Feeding power from the AC power source 1101 of the power transmitting device 1100 to the resonant coil 1104 is conducted by an electromagnetic coupling method via the electromagnetic coupling coil 1103. Feeding power from the power transmitting device 1100 to the power receiving device 1110 is conducted by electromagnetic resonance of the resonant coil 1104 and the resonant coil 1113. Further, feeding power from the resonant coil 1113 to the load 1111 is conducted by an electromagnetic coupling method via the electromagnetic coupling coil 1112.

FIGS. 4A to 4C show changes in transfer efficiency with variation in the distance D between the resonant coil 1104 of the power transmitting device 1100 and the resonant coil 1113 of the power receiving device 1110 in the contactless power feeding system using a resonance method.

First, FIG. 4B shows the case where the resonant coil 1104 of the power transmitting device 1100 and the resonant coil 1113 of the power receiving device 1110 are at a distance $D_1$ where the contactless power feeding system has the maximum transfer efficiency at a frequency $f_0$.

FIG. 4A shows the case where the distance D between the resonant coil 1104 of the power transmitting device 1100 and the resonant coil 1113 of the power receiving device 1110 is a distance $D_2$ which is smaller than the distance $D_1$. In this case, although the resonant coil 1104 of the power transmitting device 1100 and the resonant coil 1113 of the power receiving device 1110 resonate at the frequency $f_0$, the transfer efficiency is lower than in the case of FIG. 4B.

FIG. 4C shows the case where the distance D between the resonant coil 1104 of the power transmitting device 1100 and the resonant coil 1113 of the power receiving device 1110 is a distance $D_3$ which is larger than the distance $D_1$. In this case, the curve of transfer efficiency between the resonant coil 1104 of the power transmitting device 1100 and the resonant coil 1113 of the power receiving device 1110 is divided in two, and the transfer efficiency becomes maximum at a frequency $f_0'$ which is different from the frequency $f_0$. Thus, the transfer efficiency at the frequency $f_0$ is lower than in the case of FIG. 4B.

In other words, the transfer efficiency in the contactless power feeding technique using a resonance method is lowered when the distance between the resonant coil 1104 of the power transmitting device 1100 and the resonant coil 1113 of the power receiving device 1110 is smaller or larger than the distance $D_1$.

In the contactless power feeding system using the resonance method, the power efficiency changes depending on not only the distance between the resonant coils but also the impedance of a load which is a target of power feeding (in FIGS. 3A and 3B, the load 1111).

FIGS. 5A and 5B show changes in frequency and power transfer efficiency with variation in the distance D between the resonant coil 1104 of the power transmitting device 1100 and the resonant coil 1113 of the power receiving device 1110 (FIG. 5A shows the case where the distance D is small (e.g., the distance $D_2$) and FIG. 5B shows the case where the distance D is large (e.g., the distance $D_3$)). Furthermore, FIGS. 5A and 5B each show that the power transfer efficiency changes significantly depending on the impedance of the load 1111 (in FIGS. 5A and 5B, corresponding to load resistance). Note that in FIGS. 5A and 5B, the load resistance (impedance) of the load 1111 is set to 20Ω, 35Ω, 50Ω, and 100Ω.

FIG. 5A shows the relationship between frequency and transfer efficiency with the distance D being small (e.g., the distance $D_2$), i.e., with the resonant coil 1104 of the power transmitting device 1100 and the resonant coil 1113 of the power receiving device 1110 being in proximity to each other.

As shown in FIG. 5A, in the case where the distance D is small, the transfer efficiency becomes maximum when the impedance of the load 1111 is 35Ω, for example.

FIG. 5B shows the relationship between frequency and transfer efficiency with the distance D being large (e.g., the distance $D_3$), i.e., with the resonant coil 1104 of the power transmitting device 1100 and the resonant coil 1113 of the power receiving device 1110 being distant from each other.

As shown in FIG. 5B, in the case where the distance D is large, the transfer efficiency becomes maximum when the impedance of the load 1111 is 20Ω, for example.

That means that the impedance for the maximum transfer efficiency changes depending on the distance D between the power transmitting device 1100 and the power receiving device 1110.

As shown in FIGS. 5A and 5B, the maximum transfer efficiency changes depending on the distance D and the impedance of the load 1111.

As described above, the transfer efficiency of the contactless power feeding system using the resonance method changes depending on the distance D between the resonant coil 1104 of the power transmitting device 1100 and the resonant coil 1113 of the power receiving device 1110, and the impedance of the load 1111. Examples of the load 1111 which is a target of power feeding include a battery, a light, a display, and an electronic circuit, which have their specific impedances. When it is not known what is used as the load 1111, or when the impedance of the load 1111 is variable, it is difficult to control the impedance of the load 1111 in the contactless power feeding system using the resonance method.

Due to the difficulty controlling the impedance specific to the load 1111 in the contactless power feeding system using the resonance method, efficient and stable power feeding might be impossible to achieve.

In view of the above description, it is an object of one embodiment of the disclosed invention to achieve efficient and stable power feeding in a contactless power feeding system using a resonance method.

One embodiment of the disclosed invention relates to a power receiving device and a contactless power feeding system using a resonance method which includes a power transmitting device and the power receiving device.

In one embodiment of the disclosed invention, the power transmitting device includes an AC power source, an electromagnetic coupling coil, a resonant coil, and a capacitor.

In one embodiment of the disclosed invention, the power receiving device includes a resonant coil, a capacitor, an electromagnetic coupling coil, a rectifier circuit, a smoothing circuit, a voltage converter circuit, a control circuit, and a load.

In the contactless power feeding system of one embodiment of the disclosed invention, the control circuit obtains a voltage value and a current value of DC power input to the voltage converter circuit. The control circuit calculates impedance from the obtained voltage and current values.

As described above, the maximum transfer efficiency in power transfer from the power transmitting device to the power receiving device of the contactless power feeding system changes depending on the distance between the power transmitting device and the power receiving device and the impedance of the load.

Therefore, in the contactless power feeding system of one embodiment of the disclosed invention, the voltage value and the current value of the DC power input to the voltage converter circuit are controlled so that the impedance calculated by the control circuit becomes close to the impedance for the maximum transfer efficiency. Not only are the voltage value and the current value of the DC power input to the voltage converter circuit controlled, but also a voltage value and a current value of DC power output from the voltage converter circuit are controlled.

Based on the impedance calculated by the control circuit, the control circuit generates a pulse width modulation signal which controls the voltage converter circuit. The voltage value and the current value of the DC power input to the voltage converter circuit are controlled by the duty ratio of the pulse width modulation signal. The impedance can also be controlled by the control of the voltage value and the current value of the DC power input to the voltage converter circuit.

Accordingly, the control of the duty ratio of the pulse width modulation signal generated by the control circuit enables the impedance on the input side of the voltage converter circuit to be the impedance for the maximum transfer efficiency in power transfer, regardless of the impedance of the load.

Therefore, in accordance with one embodiment of the disclosed invention, efficient and stable power feeding can be achieved in a contactless power feeding system using a resonance method.

One embodiment of the disclosed invention relates to a power receiving device including: a power receiving element configured to receive an AC power; a rectifier circuit configured to convert the AC power received by the power receiving element into a DC power; a smoothing circuit configured to smooth a current of the DC power converted by the rectifier circuit; a voltage converter circuit configured to convert a voltage value of the smoothed DC power into another voltage value; a control circuit configured to obtain a voltage value and a current value of the DC power input to the voltage converter circuit, calculate an impedance from the obtained voltage value and current value, and generate a pulse width modulation signal for controlling an output voltage and an output current of the voltage converter circuit; and a load to which the output voltage and the output current of the voltage converter circuit are input. The duty ratio of the pulse width modulation signal is determined so that the impedance calculated by the control circuit becomes close to an impedance for the maximum transfer efficiency in transferring the AC power.

One embodiment of the disclosed invention relates to a power receiving device including: a resonant coil to which an AC power is transferred by electromagnetic resonance; an electromagnetic coupling coil to which the AC power is transferred from the resonant coil by electromagnetic coupling; a rectifier circuit configured to convert the AC power transferred to the electromagnetic coupling coil into a DC power; a smoothing circuit configured to smooth a current of the DC power converted by the rectifier circuit; a voltage converter circuit configured to convert a voltage value of the smoothed DC power into another voltage value; a control circuit configured to obtain a voltage value and a current value of the DC power input to the voltage converter circuit, calculate an impedance from the obtained voltage value and current value, and generate a pulse width modulation signal for controlling an output voltage and an output current of the voltage converter circuit; and a load to which the output voltage and the output current of the voltage converter circuit are input. The duty ratio of the pulse width modulation signal is determined so that the impedance calculated by the control circuit becomes close to an impedance for the maximum transfer efficiency in transferring the AC power.

One embodiment of the disclosed invention relates to a contactless power feeding system including a power transmitting device and a power receiving device. The power transmitting device includes: an AC power source configured to generate an AC power; and a power transmitting element configured to transmit the AC power. The power receiving device includes: a power receiving element configured to receive the transmitted AC power; a rectifier circuit configured to convert the AC power received by the power receiving element into a DC power; a smoothing circuit configured to smooth a current of the DC power converted by the rectifier circuit; a voltage converter circuit configured to convert a voltage value of the smoothed DC power into another voltage value; a control circuit configured to obtain a voltage value and a current value of the DC power input to the voltage converter circuit, calculate an impedance from the obtained voltage value and current value, and generate a pulse width modulation signal for controlling an output voltage and an output current of the voltage converter circuit; and a load to which the output voltage and the output current of the voltage converter circuit are input. The duty ratio of the pulse width modulation signal is determined so that the impedance calculated by the control circuit becomes close to an impedance for the maximum transfer efficiency in transferring the AC power.

One embodiment of the disclosed invention relates to a contactless power feeding system including a power transmitting device and a power receiving device. The power transmitting device includes: an AC power source configured to generate an AC power; a first electromagnetic coupling coil configured to transfer the AC power by electromagnetic coupling; and a first resonant coil configured to transfer the AC power transferred from the first electromagnetic coupling coil by electromagnetic resonance. The power receiving device includes: a second resonant coil to which the AC power is transferred from the first resonant coil by electromagnetic resonance; a second electromagnetic coupling coil to which the AC power is transferred from the second resonant coil by electromagnetic coupling; a rectifier circuit configured to convert the AC power transferred to the second electromagnetic coupling coil into a DC power; a smoothing circuit configured to smooth a current of the DC power converted by the rectifier circuit; a voltage converter circuit configured to convert a voltage value of the smoothed DC power into another voltage value; a control circuit configured to obtain a voltage value and a current value of the DC power input to the voltage converter circuit, calculate an impedance from the obtained voltage value and current value, and generate a pulse width modulation signal for controlling an output voltage and an output current of the voltage converter circuit; and a load to which the output voltage and the output current of the voltage converter circuit are input. The duty ratio of the pulse width modulation signal is determined so that the impedance calculated by the control circuit becomes close to an impedance for the maximum transfer efficiency in transferring the AC power.

In one embodiment of the disclosed invention, the load is a battery and a charge control circuit is further provided to control the charging of the battery.

In accordance with one embodiment of the disclosed invention, efficient and stable power feeding can be achieved in a contactless power feeding system using a resonance method.

BRIEF DESCRIPTION OF THE DRAWINGS

FIGS. 5A and 5B are graphs showing changes in transfer efficiency.

DETAILED DESCRIPTION OF THE INVENTION

Figure 1:
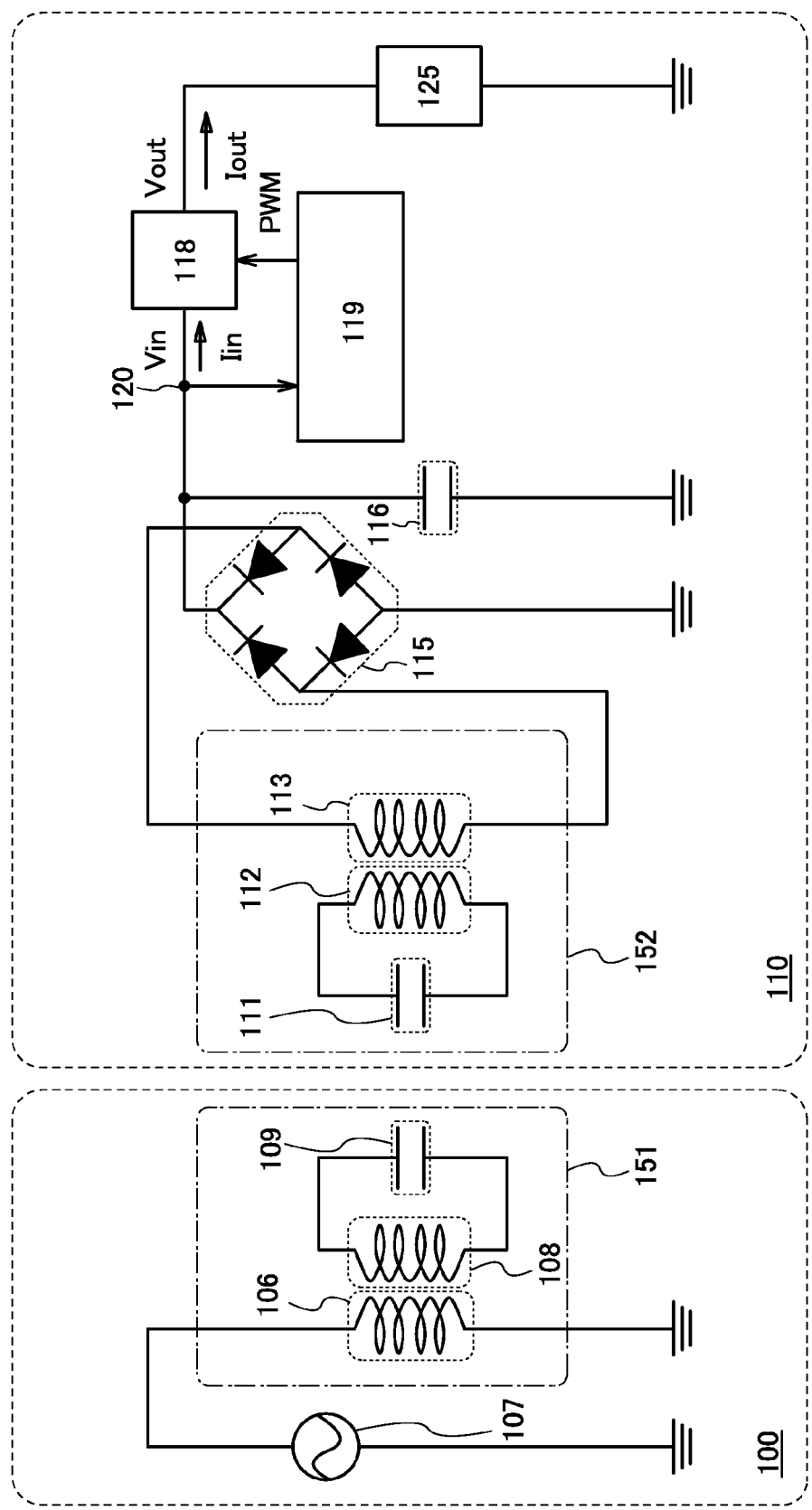
FIG. 1 is a circuit diagram of a contactless power feeding system using a resonance method.

Embodiments of the invention disclosed in this specification will be hereinafter described with reference to the accompanying drawings. Note that the invention disclosed in this specification can be carried out in a variety of different modes, and it is easily understood by those skilled in the art that the modes and details of the invention disclosed in this specification can be changed in various ways without departing from the spirit and scope thereof. Therefore, the invention disclosed in this specification should not be interpreted as being limited to the description in the embodiments. Note that in the accompanying drawings, the same portions or portions having similar functions are denoted by the same reference numerals, and repetitive description thereof is omitted.

Note that in the invention disclosed in this specification, a semiconductor device refers to an element or a device in general which functions by utilizing a semiconductor. Electric devices including electronic circuits, display devices, light-emitting devices, and the like and electronic devices on which the electric devices are mounted are included in the category of semiconductor devices.

Note that the position, size, range, or the like of each component illustrated in drawings and the like is not accurately represented in some cases for easy understanding. Therefore, the disclosed invention is not necessarily limited to the position, size, range, or the like as disclosed in the drawings and the like.

Note that ordinal numbers such as "first", "second", and "third" in this specification and the like are used in order to avoid confusion among components, and the terms do not limit the components numerically.

FIG. 1 illustrates a contactless power feeding system using a resonance method of this embodiment. The contactless power feeding system in FIG. 1 includes a power transmitting device 100 and a power receiving device 110.

The power transmitting device 100 includes an AC power source 107, an electromagnetic coupling coil 106, a resonant coil 108, and a capacitor 109. The power receiving device 110 includes a capacitor 111, a resonant coil 112, an electromagnetic coupling coil 113, a rectifier circuit 115, a capacitor 116, a DC-DC converter 118, a control circuit 119, and a load 125. A connecting portion between the DC-DC converter 118 and the control circuit 119 is referred to as a node 120.

The AC power source 107 is a power source that outputs a high frequency AC power. One terminal of the AC power source 107 is electrically connected to one terminal of the electromagnetic coupling coil 106. The other terminal of the AC power source 107 is grounded.

The one terminal of the electromagnetic coupling coil 106 is electrically connected to the one terminal of the AC power source 107. The other terminal of the electromagnetic coupling coil 106 is grounded.

One terminal of the resonant coil 108 is electrically connected to one terminal of the capacitor 109. The other terminal of the resonant coil 108 is electrically connected to the other terminal of the capacitor 109.

Feeding power from the AC power source 107 to the resonant coil 108 is conducted via the electromagnetic coupling coil 106 by an electromagnetic coupling method.

The electromagnetic coupling coil 106 of the power transmitting device 100 and the electromagnetic coupling coil 113 of the power receiving device 110 described below are each, for example, a coil of about one turn, while the resonant coil 108 of the power transmitting device 100 and the resonant coil 112 of the power receiving device 110 described below are each, for example, a coil of several turns.

The resonant coil 108 of the power transmitting device 100 and the resonant coil 112 of the power receiving device 110 described below are each open at the opposite ends. The resonant coil 108 and the resonant coil 112 have capacitors due to stray capacitance (corresponding to the capacitor 109 and the capacitor 111 in FIG. 1). Thus, the resonant coil 108 and the resonant coil 112 are LC resonant circuits. Note that the capacitor is not limited to such a stray capacitance method, and the LC resonant circuits may be obtained in such a way that the opposite ends of each coil are connected to a capacitor.

In a power transfer technique using coils, there is a parameter k×Q (k is a coupling coefficient and Q is a Q value of a resonant coil) as a parameter that represents an index of high power transfer efficiency. The coupling coefficient k is a coupling coefficient that represents a degree of coupling of the resonant coil on the power feeding side and the resonant coil on the power receiving side. Further, the Q value is a value showing sharpness in a resonance peak of a resonant circuit. As the resonant coil 108 and the resonant coil 112, resonant coils having extremely high Q values (for example, Q is larger than 100 (k×Q is larger than 1)) are preferably used, and thereby a contactless power feeding technique using a resonance method can provide a high power transfer efficiency.

Although, in FIG. 1, the power transmitting device 100 includes the electromagnetic coupling coil 106, the resonant coil 108, and the capacitor 109 (collectively referred to as a power transmitting element 151) and the power receiving device 110 includes the electromagnetic coupling coil 113, the resonant coil 112, and the capacitor 111 (collectively referred to as a power receiving element 152), the present invention is not limited to this structure. The power transmitting element 151 and the power receiving element 152 may each be a magnetic field type element including a helical antenna or an electric field type element including a meander line antenna.

The power transmitting element 151 is electrically connected to the AC power source 107, and functions to transmit an AC power generated by the AC power source 107. The power receiving element 152 is electrically connected to the rectifier circuit 115, and functions to receive the transmitted AC power.

In the power receiving device 110, one terminal of the resonant coil 112 is electrically connected to one terminal of the capacitor 111. The other terminal of the resonant coil 112 is electrically connected to the other terminal of the capacitor 111.

One terminal of the electromagnetic coupling coil 113 is electrically connected to a first terminal of the rectifier circuit 115. The other terminal of the electromagnetic coupling coil 113 is electrically connected to a second terminal of the rectifier circuit 115.

The rectifier circuit 115 is a bridge rectifier including four diodes. The rectifier circuit 115 functions as an AC-DC converter (also called AC-DC adapter) which converts AC power into DC power. The first terminal of the rectifier circuit 115 is electrically connected to the one terminal of the electromagnetic coupling coil 113. The second terminal of the rectifier circuit 115 is electrically connected to the other terminal of the electromagnetic coupling coil 113. A third terminal of the rectifier circuit 115 is electrically connected to one terminal of the capacitor 116, a first terminal of the DC-DC converter 118, and a first terminal of the control circuit 119. A fourth terminal of the rectifier circuit 115 is grounded.

The capacitor 116 functions to smooth DC power output from the rectifier circuit 115 by storing and releasing the DC power. In other words, the capacitor 116 can also be regarded as a smoothing circuit which smoothes DC power. The one terminal of the capacitor 116 is electrically connected to the third terminal of the rectifier circuit 115, the first terminal of the DC-DC converter 118, and the first terminal of the control circuit 119. The other terminal of the capacitor 116 is grounded.

The DC-DC converter 118 is a voltage converter circuit which converts a voltage value of DC power into another voltage value. The DC-DC converter 118 is provided between the rectifier circuit 115 which converts AC power into DC power and the load 125 and between the capacitor 116 which functions to smooth the DC power and the load 125.

The first terminal of the DC-DC converter 118 is electrically connected to the one terminal of the capacitor 116, the third terminal of the rectifier circuit 115, and the first terminal of the control circuit 119. A second terminal of the DC-DC converter 118 is electrically connected to a second terminal of the control circuit 119. A third terminal of the DC-DC converter 118 is electrically connected to one terminal of the load 125.

Note that a voltage applied to the first terminal of the DC-DC converter 118 and the first terminal of the control circuit 119 is referred to as an input voltage $V_{in}$, and a current input to the first terminal of the DC-DC converter 118 is referred to as an input current $I_{in}$. A voltage output from the third terminal of the DC-DC converter 118 is referred to as an output voltage $V_{out}$, and a current output therefrom is referred to as an output current $I_{out}$.

The voltage applied to the first terminal of the DC-DC converter 118 and the first terminal of the control circuit 119 is the input voltage $V_{in}$ and the current input to the DC-DC converter 118 is the input current $I_{in}$, which means that a voltage applied to the node 120 is the input voltage $V_{in}$ and a current which flows through the node 120 is the input current $I_{in}$. Note that it is assumed in this embodiment that substantially no input current $I_{in}$ flows through the control circuit 119. A method for obtaining the current value of the input current $I_{in}$ will be described later.

A signal input to the second terminal of the DC-DC converter 118 from the second terminal of the control circuit 119 is a pulse width modulation signal PWM. The pulse width modulation signal PWM will be described later.

Figure 2A:
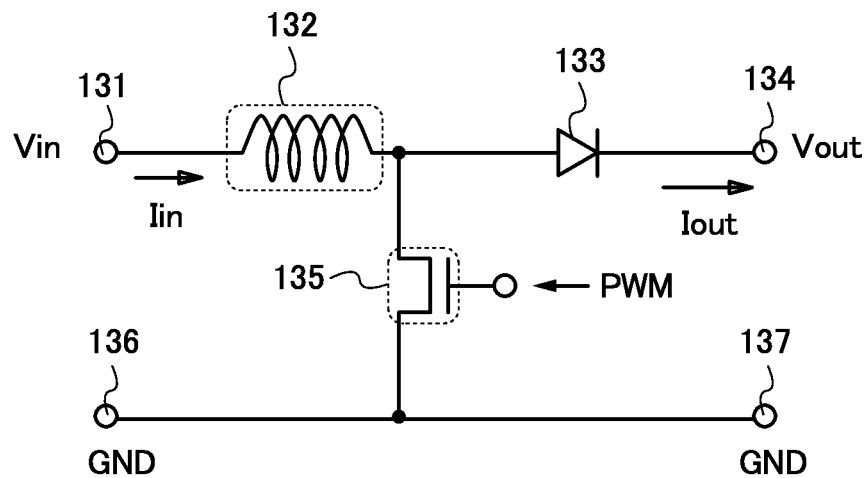
FIGS. 2A and 2B each illustrate a circuit configuration of a DC-DC converter.
Figure 2B:
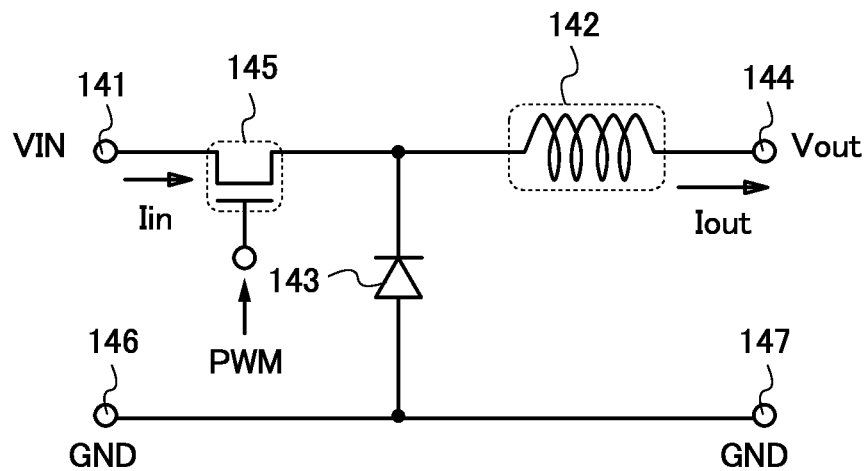
Figure 3A:
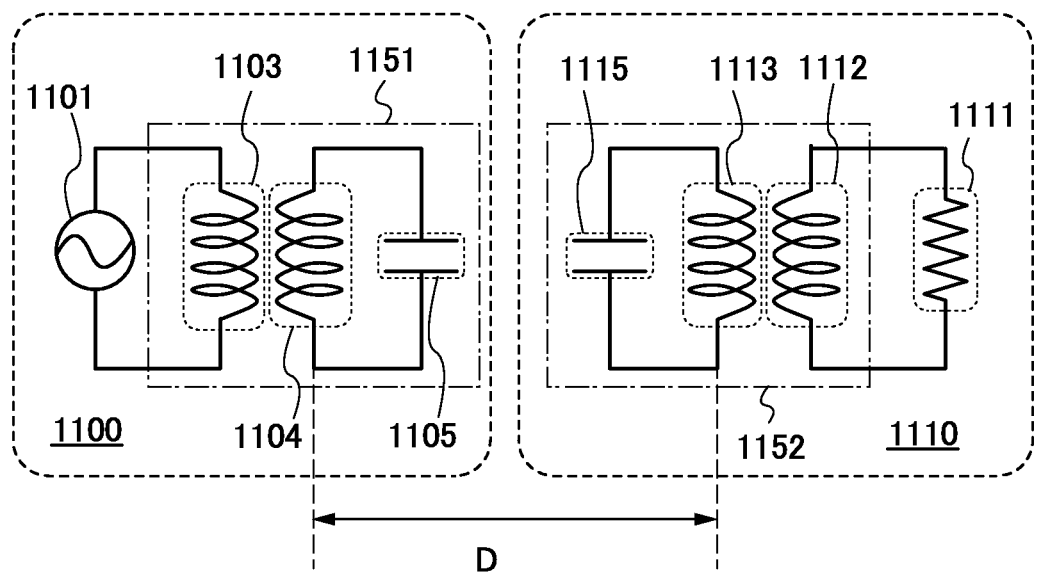
FIGS. 3A and 3B are a circuit diagram and a perspective view of a contactless power feeding system using a resonance method.
Figure 3B:
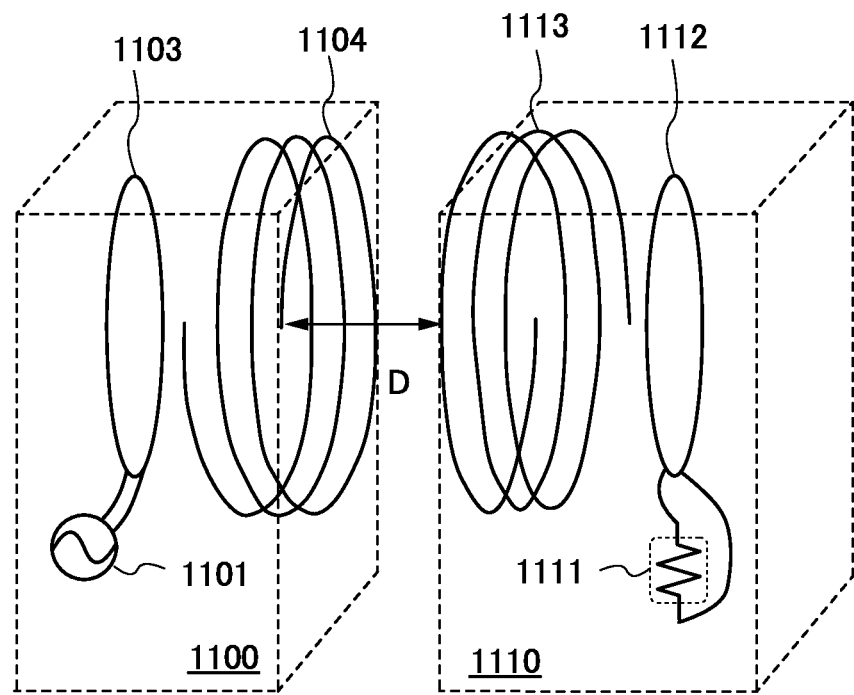
Figure 4A:
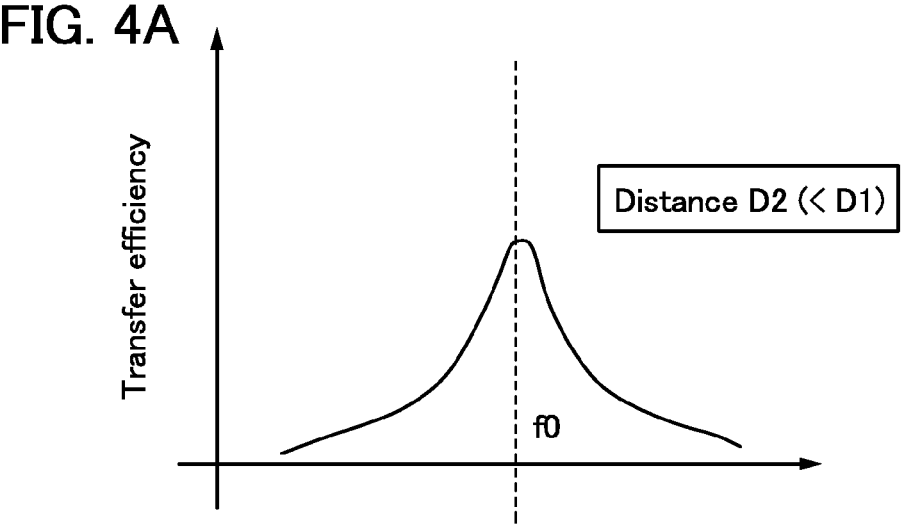
FIGS. 4A to 4C are graphs showing changes in transfer efficiency.
Figure 4B:
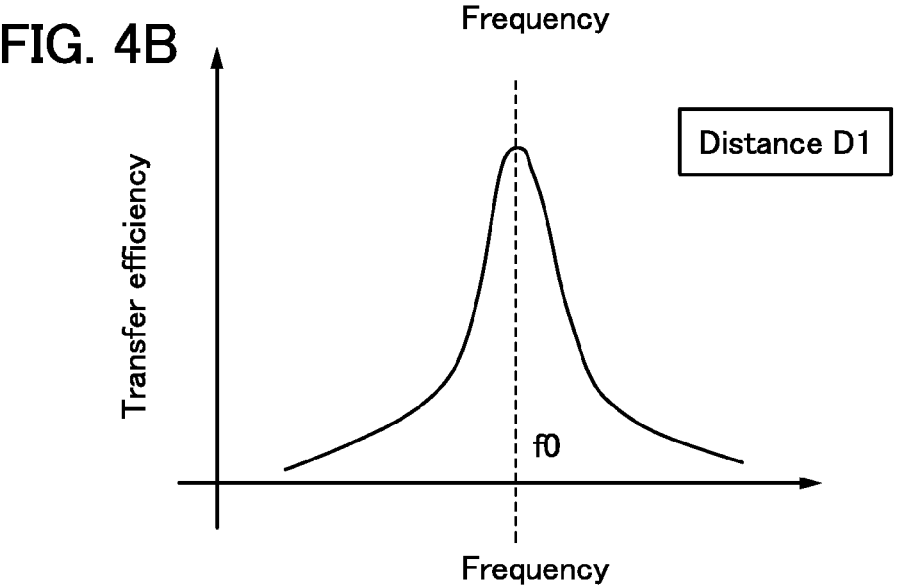
Figure 4C:
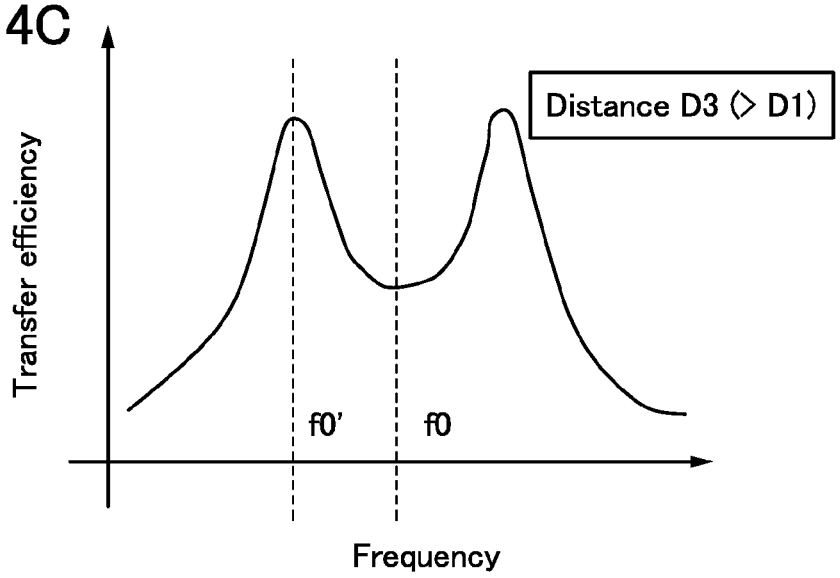

FIGS. 2A and 2B each illustrate a specific circuit configuration of the DC-DC converter 118. FIG. 2A is an example of a step-up DC-DC converter, and FIG. 2B is an example of a step-down DC-DC converter.

The step-up DC-DC converter illustrated in FIG. 2A includes a coil 132, a diode 133, and a transistor 135.

One terminal of the coil 132 is electrically connected to a terminal 131 to which the input voltage $V_{in}$ is applied. The other terminal of the coil 132 is electrically connected to an input terminal of the diode 133 and one of a source and a drain of the transistor 135.

The input terminal of the diode 133 is electrically connected to the other terminal of the coil 132 and the one of the source and the drain of the transistor 135. An output terminal of the diode 133 is electrically connected to a terminal 134 from which the output voltage $V_{out}$ is output.

The pulse width modulation signal PWM generated by the control circuit 119 is input to a gate of the transistor 135. Based on the duty ratio of the pulse width modulation signal PWM input to the gate of the transistor 135, the time when the transistor 135 is turned on can be controlled. Accordingly, the output voltage $V_{out}$ can be controlled.

The one of the source and the drain of the transistor 135 is electrically connected to the input terminal of the diode 133 and the other terminal of the coil 132. The other of the source and the drain of the transistor 135 is electrically connected to a terminal 136 and a terminal 137 to which a ground voltage GND is input. In other words, the other of the source and the drain of the transistor 135 is grounded.

In the case where the step-up DC-DC converter illustrated in FIG. 2A is used as the DC-DC converter 118 illustrated in FIG. 1, the terminal 131, the gate of the transistor 135, and the terminal 134 correspond to the first terminal, the second terminal, and the third terminal of the DC-DC converter 118, respectively.

The step-down DC-DC converter illustrated in FIG. 2B includes a coil 142, a diode 143, and a transistor 145.

The pulse width modulation signal PWM generated by the control circuit 119 is input to a gate of the transistor 145. Based on the duty ratio of the pulse width modulation signal PWM input to the gate of the transistor 145, the time when the transistor 145 is turned on can be controlled. Accordingly, the output voltage $V_{out}$ can be controlled.

One of a source and a drain of the transistor 145 is electrically connected to a terminal 141 to which the input voltage $V_{in}$ is input. The other of the source and the drain of the transistor 145 is electrically connected to an output terminal of the diode 143 and one terminal of the coil 142.

An input terminal of the diode 143 is electrically connected to a terminal 146 and a terminal 147 to which the ground voltage GND is applied. In other words, the input terminal of the diode 143 is grounded. The output terminal of the diode 143 is electrically connected to the other of the source and the drain of the transistor 145 and the one terminal of the coil 142.

The one terminal of the coil 142 is electrically connected to the output terminal of the diode 143 and the other of the source and the drain of the transistor 145. The other terminal of the coil 142 is electrically connected to a terminal 144 from which the output voltage $V_{out}$ is output.

In the case where the step-down DC-DC converter illustrated in FIG. 2B is used as the DC-DC converter 118 illustrated in FIG. 1, the terminal 141, the gate of the transistor 145, and the terminal 144 correspond to the first terminal, the second terminal, and the third terminal of the DC-DC converter 118, respectively.

The one terminal of the load 125 is electrically connected to the third terminal of the DC-DC converter 118. The other terminal of the load 125 is grounded. The output voltage $V_{out}$ and the output current $I_{out}$ of the DC-DC converter 118 are input to the one terminal of the load 125 from the third terminal of the DC-DC converter 118.

Figure 7:
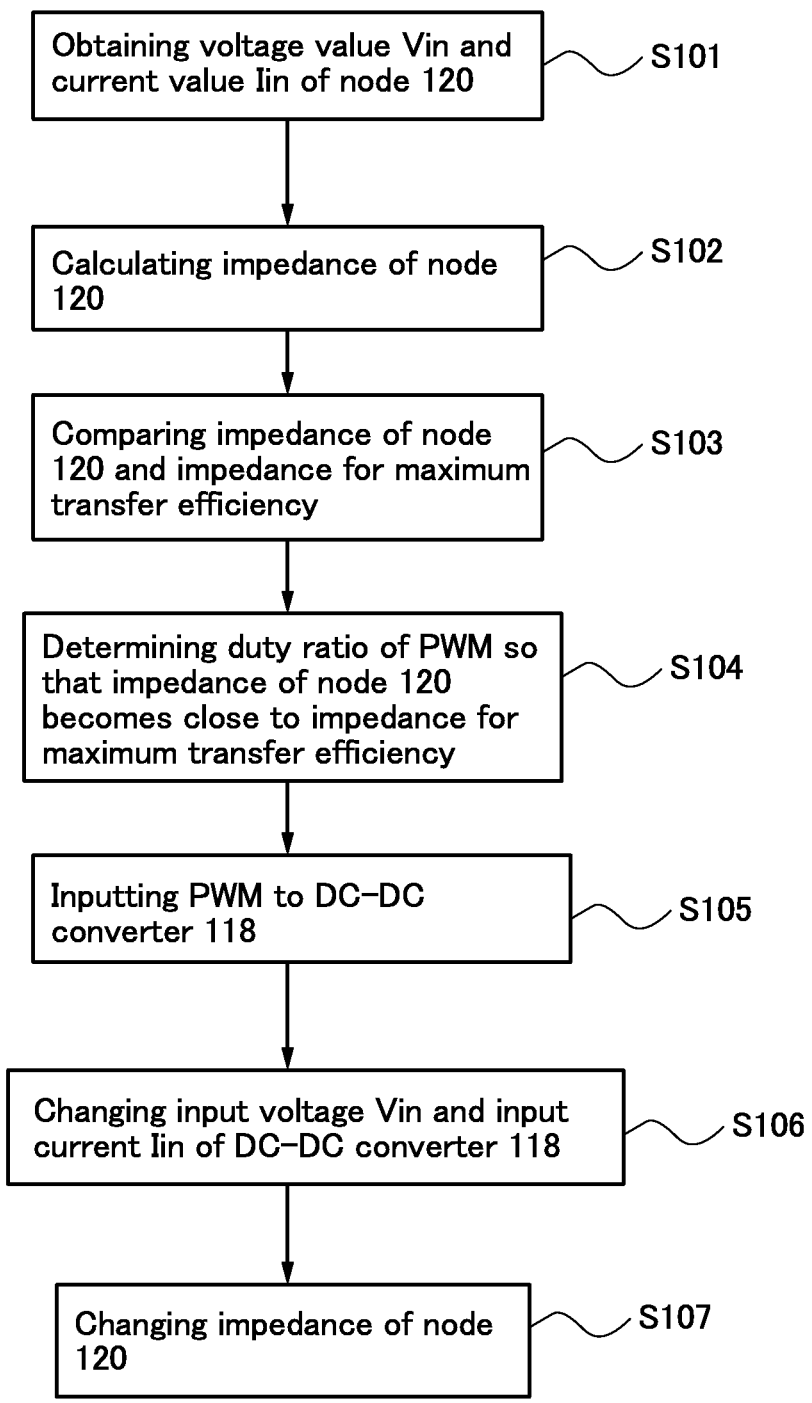
FIG. 7 is a flow chart showing an operation of a control circuit.

FIG. 7 shows an operation of the control circuit 119. The control circuit 119 obtains the voltage value of the input voltage $V_{in}$ and the current value of the input current $I_{in}$ which are input to the DC-DC converter 118 (S101). The control circuit 119 calculates the impedance (voltage value/current value) of the node 120 from the obtained current value of the input current $I_{in}$ and the obtained voltage value of the input voltage $V_{in}$ (S102). As the control circuit 119 described above, a microprocessor is used, for example.

Figure 8:
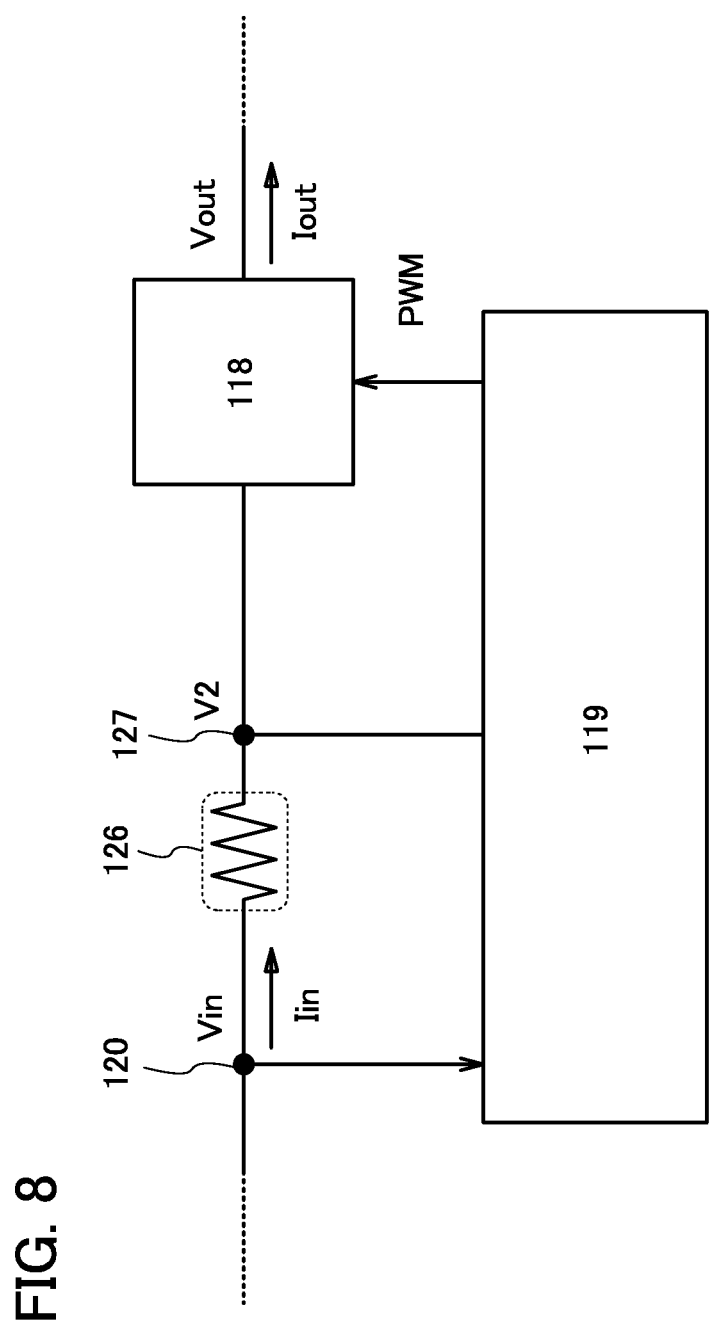
FIG. 8 is a partial enlarged circuit diagram of FIG. 1.

An example of a method for obtaining the current value of the input current $I_{in}$ will be described with reference to FIG. 8. FIG. 8 is an enlarged circuit diagram of FIG. 1. In FIG. 8, a known resistor 126 having resistance R is provided between the node 120 and the first terminal of the DC-DC converter 118. Note that the resistance R is preferably as low as possible so as not to decrease the voltage input to the DC-DC converter 118. One terminal of the resistor 126 is electrically connected to the node 120, and the other terminal of the resistor 126 is electrically connected to the first terminal of the DC-DC converter 118 and the control circuit 119. Here, a connecting portion between the other terminal of the resistor 126 and the control circuit 119 is referred to as a node 127, and a voltage of the node 127 is referred to as a voltage $V_2$.

When the known resistor 126 having resistance R is provided as described above, the current value of the input current $I_{in}$ can be obtained because $I_{in}=(V_{in}-V_2)/R$.

The control circuit 119 compares the calculated impedance of the node 120 with the impedance for the maximum transfer efficiency (S103), and determines the duty ratio of the pulse width modulation signal PWM so that the calculated impedance of the node 120 becomes close to the impedance for the maximum transfer efficiency (S104). The pulse width modulation signal PWM whose duty ratio has been determined is input to the transistor 135 or the transistor 145 of the DC-DC converter 118 (S105).

The pulse width modulation signal PWM whose duty ratio has been determined controls the input voltage $V_{in}$ and the input current $I_{in}$ which are input to the DC-DC converter 118. In other words, the input voltage $V_{in}$ and the input current $I_{in}$ are determined based on the duty ratio of the pulse width modulation signal PWM. As the duty ratio of the pulse width modulation signal PWM changes, the voltage value of the input voltage $V_{in}$ and the current value of the input current $I_{in}$ also change (S106).

The pulse width modulation signal PWM whose duty ratio has been determined also controls the output voltage $V_{out}$ and the output current $I_{out}$ which are generated by the DC-DC converter 118. In other words, the output voltage $V_{out}$ and the output current $I_{out}$ are determined based on the duty ratio of the pulse width modulation signal PWM. As the duty ratio of the pulse width modulation signal PWM changes, the voltage value of the output voltage $V_{out}$ and the current value of the output current $I_{out}$ also change.

As described above, the impedance of the node 120 is the quotient of the voltage value of the input voltage $V_{in}$ and the current value of the input current $I_{in}$. Thus, as the voltage value of the input voltage $V_{in}$ and the current value of the input current $I_{in}$ change, the impedance of the node 120 also changes (S107). In the above manner, the impedance of the node 120 can be controlled by the duty ratio of the pulse width modulation signal PWM.

This enables the impedance of the node 120 to be kept constant without dependence on the impedance of the load 125.

In the above manner, the impedance of the node 120 can be kept constant without dependence on the impedance of the load 125 of the power receiving device 110; therefore, power can be transferred with the maximum transfer efficiency.

In addition, as described above, the impedance for the maximum transfer efficiency changes depending on the distance D between the power transmitting device 100 and the power receiving device 110. However, in the contactless power feeding system of this embodiment, the impedance of the node 120 can be kept constant, which enables power to be transferred with the maximum transfer efficiency regardless of the distance D between the power transmitting device 100 and the power receiving device 110.

As described above, the contactless power feeding system of this embodiment achieves efficient and stable power feeding.

As the DC-DC converter 118, only a step-down DC-DC converter may be used depending on the target of power feeding, e.g., in the case of battery charging. In the case where the target of power feeding is a battery in the contactless power feeding system of this embodiment, the impedance of the battery changes as power feeding (charging) proceeds. However, even though the impedance of the battery changes, the impedance of the node 120 can be kept constant, which prevents a decrease of power feeding efficiency during the power feeding.

Figure 6:
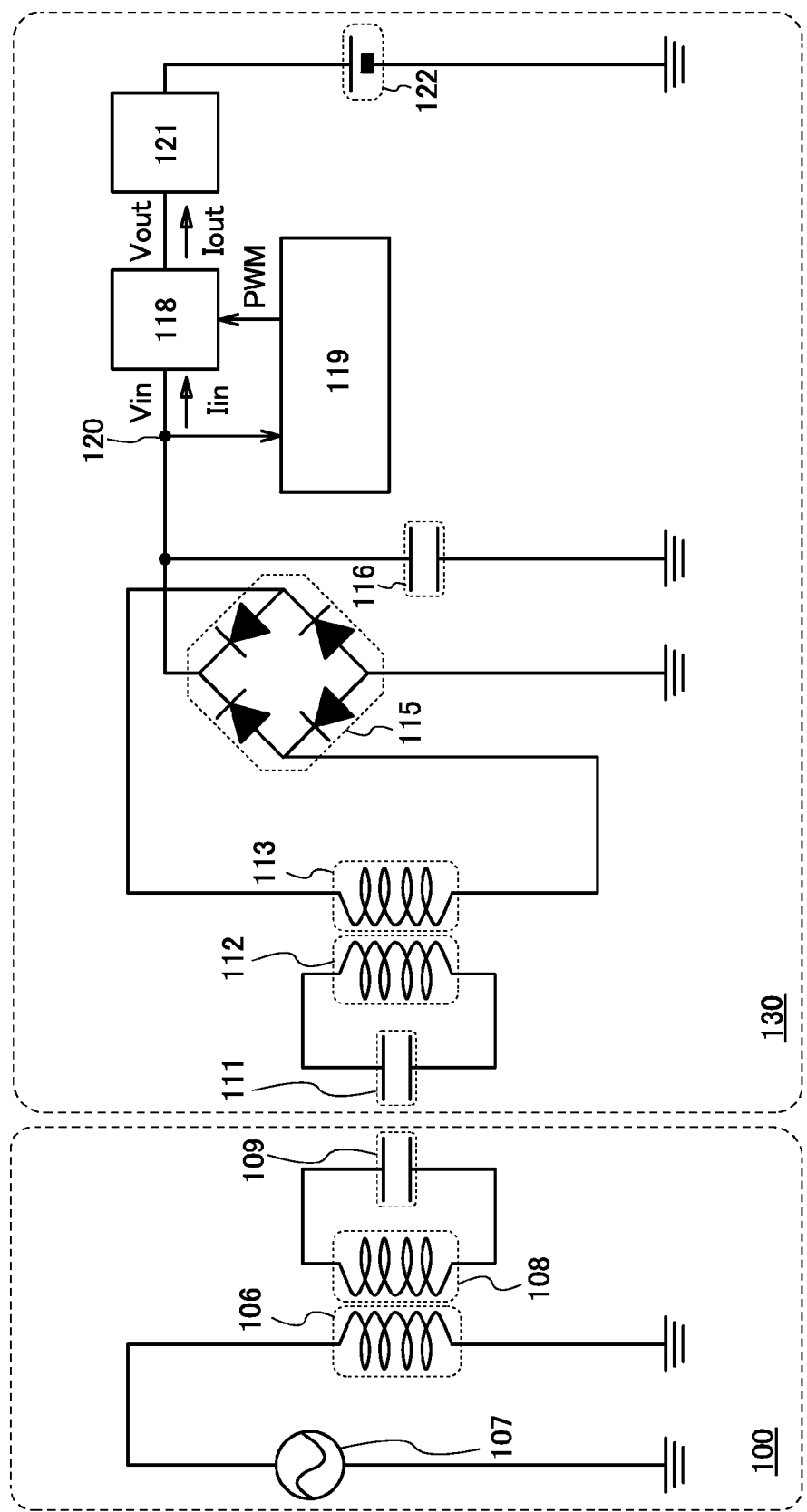
FIG. 6 is a circuit diagram of a contactless power feeding system using a resonance method.

FIG. 6 illustrates a contactless power feeding system in which a battery is used instead of the load 125 in FIG. 1. The contactless power feeding system illustrated in FIG. 6 includes the power transmitting device 100 and a power receiving device 130.

The power receiving device 130 includes a capacitor 111, a resonant coil 112, an electromagnetic coupling coil 113, a rectifier circuit 115, a capacitor 116, a DC-DC converter 118, a control circuit 119, a charge control circuit 121, and a battery 122. A connecting portion between the DC-DC converter 118 and the control circuit 119 is referred to as a node 120.

In the power receiving device 130, the battery 122 is used in place of the load 125 of the power receiving device 110, and the charge control circuit 121 is additionally provided to control the charging of the battery 122.

As power feeding (charging) proceeds, the impedance of the battery 122 changes as stated above. However, in the contactless power feeding system illustrated in FIG. 6, even though the impedance of the battery 122 changes, the impedance of the node 120 can be kept constant, which prevents a decrease of power feeding efficiency during the power feeding.

As explained above, the contactless power feeding system of this embodiment achieves efficient and stable power feeding.

This application is based on Japanese Patent Application serial no. 2011-215278 filed with Japan Patent Office on Sep. 29, 2011, the entire contents of which are hereby incorporated by reference.

What is claimed is:

1. A power receiving device comprising:
   a power receiving element configured to receive an AC power;
   a rectifier circuit configured to convert the AC power received by the power receiving element into a DC power;
   a smoothing circuit configured to smooth a current of the DC power converted by the rectifier circuit;
   a voltage converter circuit configured to convert a voltage value of the smoothed DC power into another voltage value;
   a control circuit configured to obtain a voltage value and a current value of the DC power to be input to the voltage converter circuit, calculate an impedance from the obtained voltage value and current value, and generate a pulse width modulation signal for controlling an output voltage and an output current of the voltage converter circuit; and
   a load to which the output voltage and the output current of the voltage converter circuit are input,
   wherein a duty ratio of the pulse width modulation signal is determined so that the impedance calculated by the control circuit becomes close to an impedance for maximum transfer efficiency in transferring the AC power.

2. A power receiving device comprising:
   a resonant coil to which an AC power is transferred by electromagnetic resonance;
   an electromagnetic coupling coil to which the AC power is transferred from the resonant coil by electromagnetic coupling;
   a rectifier circuit configured to convert the AC power transferred to the electromagnetic coupling coil into a DC power;
   a smoothing circuit configured to smooth a current of the DC power converted by the rectifier circuit;
   a voltage converter circuit configured to convert a voltage value of the smoothed DC power into another voltage value;

a control circuit configured to obtain a voltage value and a current value of the DC power to be input to the voltage converter circuit, calculate an impedance from the obtained voltage value and current value, and generate a pulse width modulation signal for controlling an output voltage and an output current of the voltage converter circuit; and a load to which the output voltage and the output current of the voltage converter circuit are input, wherein a duty ratio of the pulse width modulation signal is determined so that the impedance calculated by the control circuit becomes close to an impedance for maximum transfer efficiency in transferring the AC power.

3. The power receiving device according to claim 1, further comprising a charge control circuit, wherein the load is a battery, and wherein the charge control circuit is configured to control charging of the battery.

4. The power receiving device according to claim 2, further comprising a charge control circuit, wherein the load is a battery, and wherein the charge control circuit is configured to control charging of the battery.

5. A contactless power feeding system comprising:

a power transmitting device comprising:

an AC power source configured to generate an AC power; and a power transmitting element configured to transmit the AC power; and the power receiving device according to claim 1.

6. A contactless power feeding system comprising:

a power transmitting device comprising:

an AC power source configured to generate an AC power;

a first electromagnetic coupling coil configured to transfer the AC power by electromagnetic coupling; and a first resonant coil configured to transfer the AC power transferred from the first electromagnetic coupling coil by electromagnetic resonance; and the power receiving device according to claim 2.

7. The contactless power feeding system according to claim 5, further comprising a charge control circuit, wherein the load is a battery, and wherein the charge control circuit is configured to control charging of the battery.

8. The contactless power feeding system according to claim 6, further comprising a charge control circuit, wherein the load is a battery, and wherein the charge control circuit is configured to control charging of the battery.

* * * * *